United States Patent [19]

Ridgway et al.

[11] 3,942,562
[45] Mar. 9, 1976

[54] QUANTISING MACHINES

[75] Inventors: Anthony Douglas Ridgway, St. Albans; John Hugh Smith, Biggleswade; Peter Terrick Stainforth, Knebworth, all of England

[73] Assignee: Imperial Chemical Industries Limited, London, England

[22] Filed: May 13, 1974

[21] Appl. No.: 469,677

Related U.S. Application Data

[62] Division of Ser. No. 227,800, Feb. 22, 1972.

[30] Foreign Application Priority Data

Feb. 25, 1971 United Kingdom............. 5411/71
Feb. 25, 1971 United Kingdom............. 5412/71
Feb. 25, 1971 United Kingdom............. 5413/71
Feb. 25, 1971 United Kingdom............. 5414/71

[52] U.S. Cl. .................. 141/83; 177/94; 220/20; 222/193; 259/154
[51] Int. Cl.² ............................................. B65B 1/32
[58] Field of Search ............. 220/20; 259/154; 177/90–97; 222/193; 141/83, 290, 129, 290

[56] References Cited

UNITED STATES PATENTS

| 690,820 | 1/1902 | Arthur .......................... 177/94 |
| 3,073,400 | 1/1963 | Bauder et al. ............... 141/83 |

*Primary Examiner*—Houston S. Bell, Jr.
*Attorney, Agent, or Firm*—Cushman, Darby & Cushman

[57] ABSTRACT

A device for controlling the flow of fine powders in a quantising machine includes a pinch valve in combination with a fluidiser maintaining a constant head of fluidised powder. A weigh bucket having a plurality of compartments is rotatably mountable to allow simultaneous filling and discharge. Means for delivering charges of fine powders to receivers rapidly with low change in quantity of the charge, have a power-tight system from the charge measuring means to the receiver, and means for venting the air from the receiver. Accurate net weighing machines for rapidly weighing and delivering charges of fine powders incorporate some or all of the above features in an integrated system.

10 Claims, 22 Drawing Figures

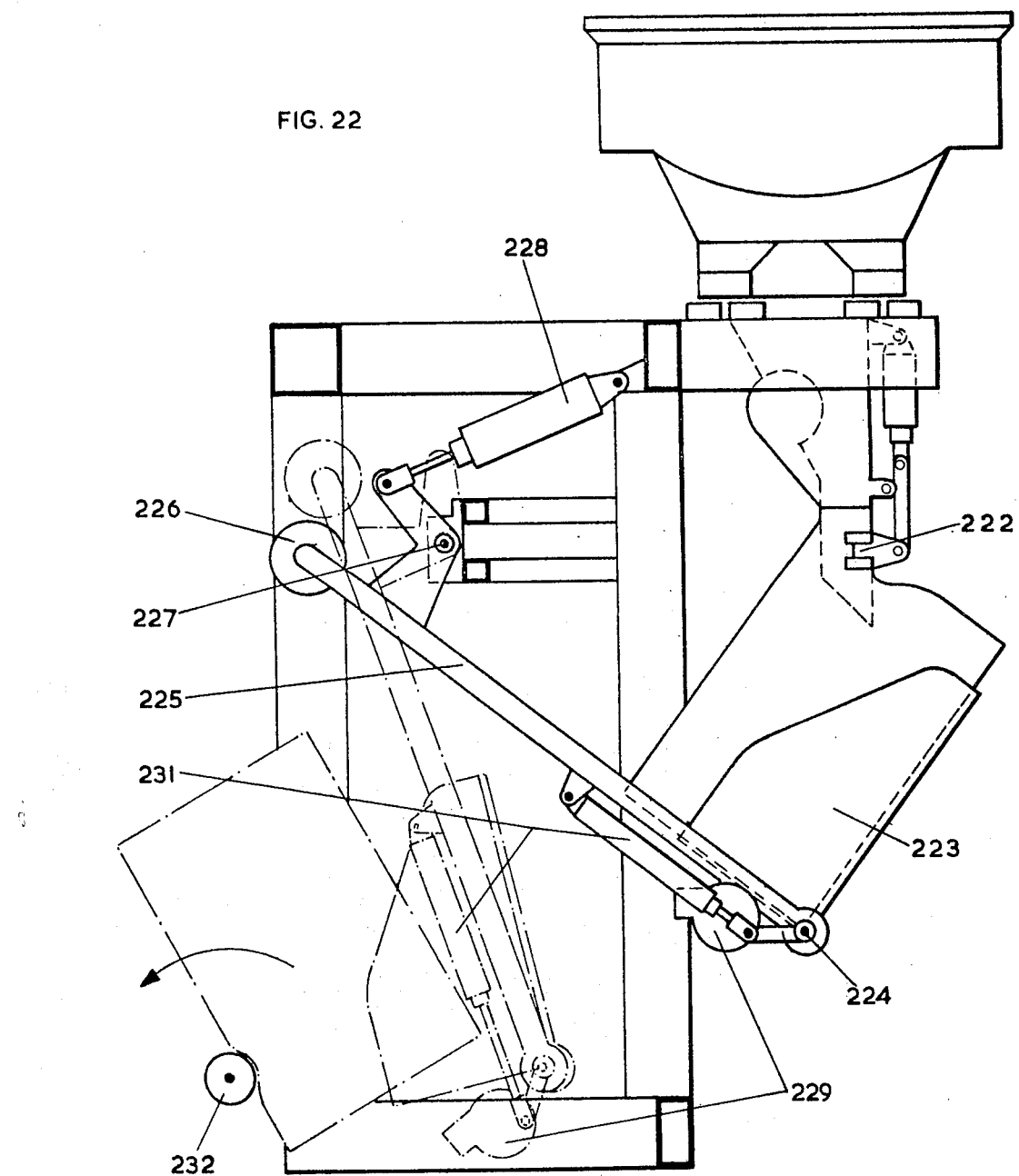

QUANTISING MACHINES

This is a division of application Ser. No. 227,800 filed Feb. 22, 1972.

The invention relates to quantising machines, and parts for such machines, the machines being designed for filling receivers such as paper or plastic sacks, with a predetermined quantity of particulate material.

The parts have been developed for providing short cycle times with high accuracy during repeated quantisations of fine powders, but coarser materials presenting generally fewer problems, may be quantised in a similar manner. These parts are especially suited to net weighing machines, although many of the parts may also be suitably incorporated into other types of quantising machines, such as those providing charges having a measured volume. We will therefore first describe the parts or groups of parts in isolation, and then two net weighing machines incorporating such parts and which are adapted for filling open sacks and valve sacks respectively, will be specifically described to illustrate the manner in which the parts may be integrated.

Weighing machines for weighing out and delivering charges of materials having a net weight of a predetermined value, are generally required to operate with considerable accuracy and short cycle times, e.g. to deliver 25 kg every few seconds with an accuracy better than ±0.25%. A form of weigh bucket which has been employed in net weighing machines previously is one having a trap door at its lower end, the trap door being openable for release of the weighed charge of material, when the predetermined net weight has been delivered to the weigh bucket. However, with a device of that type, it was essential that all the material forming one charge should be removed from the weigh bucket and the trap door sealed before feeding of the next charge to the weigh bucket began.

According to one aspect of the present invention, we provide a weigh bucket comprising a plurality of separate compartments each having an outward facing opening, the weigh bucket being rotatably mountable in a weighing machine whereby each compartment in turn may have its opening upwardly presented for receiving the material while another opening becomes generally downward facing for discharge of the material contained in its compartment.

We generally prefer that the axis of rotation of the bucket be horizontal. However, this is not essential, and where it is required that delivery of the weighed charge be displaced from the vertical axis of the feed conduit, an inclined axis of rotation, making an angle usually not greater than 45° to the horizontal may be conveniently employed. By the term "generally downward facing" we mean that the opening is presented in such a manner that the contents of the container may be completely discharged under gravity. Where it is required that delivery of the weighed charge be displaced from the vertical axis of the feed conduit the axis orthogonal to the opening may be inclined at a considerable angle from the vertical, and still be sufficiently downward facing to enable the contents to be discharged.

Our preferred weigh bucket is one having two separate compartments of a corresponding size and shape with spaced apart opening arranged so that in a first position one compartment may have an upwardly presented opening to receive the material to be weighed, while the other compartment has a generally downward facing opening for discharge of the weighed charged of the material, the bucket being rotatable to a second position in which the other compartment may receive material while the one compartment discharges its load.

Although faster cycle times may be obtainable by using a rotatable weigh bucket, new problems may arise on account of the rotary motion. While the bucket is rotating, it is considerably out of balance due to one compartment being loaded with the charge. This may produce uneven wear on whatever means are used for suspending the bucket. Furthermore, the bucket requires positive location into its first or second position at the start of each weighing cycle, to avoid spillage of the material during feeding to or delivery from the bucket. Associated with these two problems, is the problem of smoothly arresting the bucket as it approaches the second position. We find that these problems may be more easily overcome when using a two-compartment bucket arranged to be oscillated about its rotational axis between the first and second positions. By oscillating the bucket rather than maintaining a constant direction of rotation, the wear on the suspension means is evened up, and positive location of the bucket in the first and second positions may be simply achieved by the use of suitably located permanent stops, if desired.

Furthermore, rotation of the bucket in alternate directions instead of in the same direction each time, renders the weigh bucket particularly suitable to being powered by pneumatic means, such as a cylinder and piston assembly connected to the weigh bucket by an off-set linkage, such as a crank, and arranged so that the piston is at one end of its stroke when the weigh bucket is in the first or second position, and is at the other end of its stroke when the bucket is mid-way between the two positions. In this manner the first and second positions may be determined by the stroke of the pneumatic means, and for heavy loads some braking effect may also be provided by the pneumatic assembly. Since the braking may thus be effected by the device used to initiate rotation, when the arrangement forms part of a weighing machine the total weight suspended from the weight-sensing means, e.g. a weigh beam, may be considerably reduced from that required, for example, for an electrical motor having separate braking means for controlling the rotary motion.

The bucket may simply be in the form of an open ended hollow shell bisected by a transverse web to form two separate compartments. Such a shape may readily be constructed from glass fibre reinforced polyester resin, providing a strong bucket having low mass. As for the combination above, the low mass of the bucket itself also provides for more sensitive weighing. It also reduces the inertia of the rotating mass.

The choice of weight-sensing means for use with the above weigh bucket is not critical and the weigh bucket, for example, may be hung from a spring balance or from a weigh beam. Where a weigh beam is used this would normally be mounted on a knife edge, with the weigh bucket also hung from the beam on a knife edge. Where knife edges are so employed, we prefer that the axis of rotation of the bucket be perpendicular to the knife edges so as to minimise the effect of the rotation of the bucket in inducing rotation of the parts about the knife edges. The knife edge system may be replaced by a cross-spring pivot system to avoid the relatively high rate of knife edge wear. However, we would still rotate the bucket across the pivot system in order to maintain stability.

In order to achieve both speed and accuracy, it is essential that the material is fed rapidly and in a reproducible manner to the weigh bucket or other container for the charge, but control of such powder flow can present considerable problems when handling fine powders.

According to a further aspect of the present invention, we provide a device for controlling the flow of fine powders in a quantising machine, the device including a fluidiser in which the powder is fluidised and maintained with an approximately constant head above an outlet therefrom; and a pinch valve comprising a resiliently flexible tube connected to said outlet, and at least one pair of jaws closable about the tube so as to collapse a portion of the tube and bring the sides thereof into sealing engagement.

By the reference to the constant head "above" the outlet, we refer to the situation in which the upper surface of fluidised powder is maintained at a level higher than the level of the outlet by a constant amount, even though it may be displaced laterally from the vertical through the outlet.

By maintaining the material in a state of fluidisation, we find that the powder will generally flow without blocking even when fine powders are handled. It is most convenient to arrange the fluidiser and valve such that the fluidised powder may fall from the fluidiser to the valve under gravitational forces.

Fluidisation may be brought about in the usual manner by blowing a gas through the powder from below, with sufficient velocity to support the particles so that the material is given fluid-like properties, but not sufficient to cause the individual particles to be entrained in the flow so as to be carried from the fluidiser. The fluidiser conveniently comprises a container having a chamber at its lower end with a port for receiving the fluidising gas, the upper wall of the chamber which separates it from the remainder of the container being porous to allow the gas to be supplied to the chamber. The porous wall is suitably in the shape of an inverted cone with the container outlet located at the apex of the cone. The porous cone may be formed from a perforated metal plate, sinter mesh or other suitable porous material.

The container preferably has flexible walls, since we find that the state of fluidisation may be determined conveniently by the feel of the flexible walls. Suitable materials are woven nylon fabrics, preferably coated with polyurethane resin.

Our preferred arrangement is to have a small container whose capacity is conveniently of the order of two charges of material, and to replenish this from a main hopper separated from it by baffles arranged to provide an approximately constant level of fluidised powder in the small container, escape vents being provided to enable the fluidising gas to be vented. When withdrawing discreet charges from this container, the level of the fluidising powder may tend to temporarily fall, but will be replenished from the main hopper between charges. Under such conditions it is intended that the head of fluidised powder in the small container should be approximately constant at least at the start of all withdrawals of fluidised powder from the outlet. In this manner, the pressure of the fluidised powder at the valve will always be substantially the same at least at the start of each weighing operation, and so the initial pressure drop across the valve which causes the powder to start to flow therethrough, will be substantially the same for each charge measured.

The fluidised material leaves the fluidising container through the outlet and enters the resiliently flexible tube of the pinch valve. We prefer to keep the distance between the outlet and the closable part of the tube as short as possible to help maintain the powder in the fluidised state as it falls. In order to assist such maintenance of fluidisation, particularly where the distance between the outlet and the closable part has been extended by means of suitable conduit, a probe extending downwardly from the outlet may be provided for supplying further fluidising gas at the lower level. The probe should therefore be extended towards the closable portion of the valve as far as possible without restricting the flow for any of the working positions of the valve, or preventing the sides of the tube from being pressed together into the closed state.

The pinch valves may have one or more pairs of jaws closable about the tube, but the full specification of the valve will depend on its desired application. Thus for example, the valve may have a single pair of jaws to provide only open and closed states, or some form of throttling action may be provided, e.g. by partial closure of the single pair of jaws. Where the control means is to be used for controlling the rate of flow of a fine powder for producing accurately measured charges thereof in rapid succession, e.g. in a weighing machine, we prefer to use a pinch valve having first and second pairs of jaws closable about the resiliently flexible tube so as to press together the sides of the tube into sealing engagement, the first pair of jaws being closable about only a fraction of the diameter of the tube so as to leave the remainder of the tube open and provide a restricted flow passage therethrough, and the second pair of jaws being closable about the full diameter of the tube to provide the valve with a fully closed state. Thus in the preferred valve, the throttling action is provided by complete closure of the first pair of jaws so that over part of the diameter of the flexible tube, the sides are brought into sealing engagement. In respect of the fully closed state, we found that if we used a final pair of jaws which closed across only that part of the tube remaining open after closure of the first jaws, i.e. with the jaws staggered, it was very difficult to prevent leakage of the fluidised fine powder.

By the term "resiliently flexible tube" we mean a tube which by reason of its flexibility may be closed by the jaws, but which is sufficiently resilient to take up its original shape when the jaws are again opened. A tube having such a property will also maintain an open passage when part of the diameter is closed by the jaws. Thus for example, a resiliently flexible rubber tube having an outside diameter of 12.7 cm, was partly closed by closure of a first pair of jaws extending about 7.5 cm across the diameter of the tube, the rest of its diameter remaining open and roughly circular in section. After each weighing cycle the tube immediately resumed its generally circular cross-section when the jaws opened.

We also found that the desire to obtain such a high degree of accuracy while filling receivers in such short cycle times, for example the delivery of a charge of 25 kg every few seconds, gave problems with the prevention of either loss of charge by scattering, or increase in delivered charge by way of material built up from previous charges onto the surface of shrouds and the like, and released. We have now developed a means for delivering each measured charge to a receiver with very low gain or loss of material, and wherein delivery is effected in a time interval comparable with the remainder of the cycle described herein. Although such means are particularly adapted to be compatible with the remainder of the present weighing machine, they may also be used to good effect in other measuring devices, particularly those having a similar cycle time.

In developing this apparatus we found that with the usual frusto-conical funnel having an abrupt transition between the cone and a substantially cylindrical spout, fine powders tended to block and the time of discharge was considerably increased thereby. We therefore prefer that any change in the angle of the internal surface of the funnel be gradual in at least one longitudinal plane. By smoothing the transition in the longitudinal change of the angle of the internal surfaces so that the powder is smoothly accelerated as it passes down the funnel, and by providing an escape path for the displaced air, we found that the problem of blocking was generally overcome. We further found that provided with the transition in one longitudinal plane was gradual, a sharper transition could be successfully used in the orthogonal longitudinal plane. The problems of powder flow, however, beome particularly acute with the filling of valve sacks, where the weighed charge must pass through the small diameter valve spout within the short time available, while venting the air displaced without loss of powder, and ways have been devised for improving powder flow in such extreme cases. Modifications for such extreme cases are not generally necessary for open-mouthed sacks or similar receivers having less restricted entrances and hence such modifications intended mainly for use when filling valve sacks and the like, will be described separately hereinafter.

The clamping means must have a rapid action if a short measuring and delivering cycle is to be achieved and a convenient clamping means comprises a pair of jaws capable of closing onto and withdrawing from the lower end of the funnel. Where the receiver is a paper or plastics sack, the mouth of the sack is placed around the lower end of the funnel and it is held thereto by pressure from the clamping jaws. We find that by employing a funnel having a lenticular outer surface formed from an elastomeric material, and using clamping jaws shaped to correspond with the larger-radiused sides of the funnel, we can readily obtain a substantially powder-tight seal between the sack and the lower end of the funnel. This type of clamping means may retain the bag in position for receiving the charge without the provision of further means for supporting the sack, if desired.

In order that the duct or ducts shall not interfere with the clamping of the receiver onto the funnel, and in order that it shall not interfere with the flow of powder through the funnel, we prefer that the one or more ducts be integral with the funnel and faired therein so as not to disturb the smoothness of both the inner and outer surfaces. In our preferred lenticular-shaped funnel, the ducts may be conveniently formed by providing the smaller radiused edges with an internal web extending between the two sides of the funnel so as to provide two ducts extending for the length of the funnel. The upper ends of the ducts communicate with the space enclosed by the flexible casing, so that any fine powder which is drawn up through the ducts by the venting air will again fall back through the funnel into the receiver. Plates for downwardly deflecting the venting air as it emerges from the upper end of the ducts, may also be provided to assist in the rapid return of any entrained powder to the receiver.

The casing extending upwardly from the funnel preferably encloses the weigh bucket or other measuring means, save for an opening at its upper end to enable the powder to be fed to the measuring means. We thereby prevent both ingress and egress of material respectively to or from the part of the machine handling the weighed charge.

We further prefer that the casing be flexible. We find we obtain less build up of powder on the inner surface of a flexible casing than we had when we used a rigid metal casing, and moreover, when using the specific form described hereinafter and illustrated in the drawings, we have not had any build up of powder on the casing. Additionally a flexible casing may generally be made more economically since the provision of close tolerances in the size, shape and position of mating parts is not required, and the flexible casing may be simply unhooked from a support at its upper end for maintenance purposes, and generally for access to the weigh bucket or other suitable container. A suitable material for the casing is a woven nylon cloth, and this may be coated with a polyurethane resin to provide an even smoother surface, if desired.

Possing of the receiver may be necessary for fast filling in order to deaerate the powder as quickly as possible and consolidate it at the bottom of the receiver, and in some cases to clear it from the end of the funnel and prevent back-up of powder therein which might otherwise restrict the flow. For vibrating open mouthed sacks hanging from the delivery funnel, the possing means is most conveniently arranged to vibrate the funnel, and hence it will also vibrate the flexible casing and the sacks attached to the funnel. When filling valve sacks, efficient possing of the sacks becomes more important for keeping the end of the funnel clear during delivery. However, the valves are not sufficiently strong to support the weight of a full sack, and some form of supporting cradle is required. In such machines we prefer to attach the posser to the cradle rather than to the funnel. Indeed, when using impellers as described hereinafter, possing of the funnel itself becomes of less importance, and by attaching the posser directly to the cradle, the possing motion may be applied where most required.

Any of the usual possing means may be employed, but we prefer one comprising two out-of-balance motors mounted on brackets extending outwards from the funnel, the motors being arranged to rotate in opposite directions. The out-of-balance of the motors on falling into phase with each other, provide the funnel with a vertical vibratory motion. The period of vibration is not at all critical, and vibrations of the order of 1000–3000 cycles per minute are convenient for producing amplitudes of 1 to 0.25 cm. The slower the rate of vibration, the greater is the amplitude. The rate of possing may thus be adjusted according to requirements. For example, when handling very aerated, very fine materials, we prefer to use a lower rate and greater amplitude. Where part of the function of the possing action is to clear narrow filling spouts, a more circular motion may be preferred, and a single out-of-balance motor may form a suitable posser.

Powders of polymeric materials are particularly prone to acquiring a static electric charge, and we found this caused a coating of very fine particles to adhere to the inside surfaces of each weigh bucket compartment instead of being discharged with the remainder of the weighed powder batch. Powder may at times likewise adhere to the inside of other similar containers used for other quantisation processes. This build up can amount to several hundred grams, which makes accurate quantisation more difficult to achieve. To overcome this problem, we provide the machine with one or more nozzles for directing a blast of moist air at high pressure against the inside surfaces of the container when the latter is in the discharge position. We find that a short blast of moist air at high pressure, of about 0.5 sec duration for example, applied to the inside surfaces of the compartment immediately after discharge of the powder is particularly effective in dispersing the static electricity and dislodging adherent powder frm the bucket sides. The nozzles may conveniently be located around the mouth of the delivery funnel directed upwards and inclined so that the blast of air impinges against the maximum inside-surface area.

The above described machine may provide fast filling of open mouthed sacks without necessarily requiring any modification, but some receivers have much narrower mouths, notably valve sacks having mouth diameters typically of about 12 cm for 25 kg sacks. The problem we faced was therefore the ability to deliver a weighed charge (e.g. 25 kg) into the sack through such a narrow opening in a time comparable to that required for the remainder of the cycle (e.g. about 4–6 sec), and to vent the air trapped in the sack without loss of the weighed powder. We overcame these problems by incorporating a number of modifications described hereinbelow, each of which provides a reduction in delivery time. For fastest operation, we prefer that all the modifications be incorporated, but only selected modifications may be used if desired. Similarly, these modifications need not be confined to their use with narrow mouthed receivers, but in general we have not found them necessary with open mouthed sacks.

Our first modification was to provide a plurality of delivery funnels, so that a corresponding multiple of the cycle time was available. We prefer to provide two adjacent funnels arranged to be fed alternately by the measuring means so that a receiver on one funnel may be changed while another receiver on the other funnel is being filled. The two mouths of the funnels may then be adapted to form a single opening bisected by a weir having a slot extending therealong to which air or vacuum may be applied for providing an air curtain to oppose any carry-over of powder from one funnel to the other. Of the two, we prefer the high pressure air curtain because this may also clean the outside sloping surface of the weigh bucket, or other measuring means, after each discharge. Again as above, each funnel is provided with its own vent preferably enclosed within the funnel and integral therewith, at least at its lower end, the outlet of the vent at its upper end being positioned such that any powder carried with the venting air is returned to the mouth of the same funnel.

For weighing charges when using apparatus incorporating twin delivery funnels, we prefer to use a two compartment weigh bucket adapted for oscillation as described hereinabove, wherein the outward facing openings of the two compartments are arranged such that the angle through which the bucket is rotated in replacing the mouth of one compartment with that of the other compartment in the upward-facing position for receiving the charge, is less than 180°. Our preferred angle is 150°, allowing good separation of delivery centres, i.e. 60°, while allowing for the compartment to be shaped to enable the charge to slide out. By further reducing the angle, removal of the charge becomes more difficult, and angles less than 130° are preferably avoided. Likewise, with angles greater than 170°, it is difficult to obtain sufficient separation of delivery centres.

A further modification is the provision in the delivery funnel of an impeller having rotatable blades to drive the powder down the delivery funnel. When using a suitably placed impeller, the avoidance of sharp changes of cross-section in the longitudinal direction is less important than when the powder is required to fall rapidly under its own weight, although a smooth flare may still be advantageous. Our preferred impeller comprises a rotatable hub mounted horizontally at one side of the funnel and extending across the full width of that side. Mounted on the hub are a plurality of radially extending blades which on one side of the hub project out into the path of the falling powder, preferably extending about half way across the funnel. The impeller may be driven by an electric motor, and a suitable speed has been found to be of the order of 3000 r.p.m.

A suitable impeller is one having for example 6 equally spaced radial blades. However, we prefer an impeller having three sets of blades, each set occupying one third of the width of the rotor. Each set has three radial blades equally spaced around the hub, the three sets being arranged with the two outer sets having blades in phase with each other but out of phase with the middle set, so that on viewing the rotor along its rotational axis, there appear to be 6 blades equally spaced around the hub. We further prefer that the outer ends of each blade, or the blades of each outer set, as the case may be, should be inclined to the rotational axis so as to concentrate the powder stream into a central, dense, high velocity core.

The valve sack may be held onto the end of the funnel by a clamping pad acting on the outside of the valve in much the same manner as that described above in respect of open mouthed sacks, clamping pressure being similarly provided by a pneumatic system. In the absence of an impeller, the sack would normally be released automatically from the funnel after a pre-arranged timed delay. However, the provision of an impeller enables a more satisfactory system to be employed. The impeller motor current load falls abruptly when there is no more powder remaining in the funnel, and this may be used to activate a relay system for automatically releasing the sack on completion of powder delivery. This removes the danger of powder loss should the weighed powder charge take longer to convey into the receiver than anticipated. The impeller also provides further advantages in that as soon as the last powder leaves the impeller, the same fan action sweeps the spout clean and hence prevents spillage from the spout when the sack is removed. Furthermore, the impeller acting as a fan blows up the sack to receive the charge, as soon as an empty sack is fitted to the end of the funnel. This removes the necessity for the provision of separate means to inflate the bag before receiving the charge.

A further modification for improving the rate of flow of the powder is the provision of a fluidising system in the delivery funnel. Our preferred system comprises a large porous pad on one of the sloping surfaces of the funnel, located immediately above the impeller. Air may then be fed into the falling powder through the porous pad so as to dilate the powder and cause it to flow faster along the surfaces of the funnel towards the impeller.

According to the present invention there is provided a weighing machine suitable for repeatedly delivering to receivers a predetermined charge of fine powder. The machine according to the present invention comprises:

a fluidizer having an outlet, in which the powder is fluidized and maintained with an approximately constant head of fluidized powder above the outlet at least at the start of each weighing cycle, a rotatable weigh bucket mounted on weight-sensing means, said weight-sensing means generating a signal in response to weight in said weigh bucket, said weigh bucket having separate compartments arranged so that by rotation of said weigh bucket each compartment may in turn be positioned for receiving powder from said fluidizer which another compartment discharges its load, valve means connected to said fluidizer outlet for controlling the flow of powder from said fluidizer, said valve means being operable in response to a signal generated by said weight-sensing means, and means for delivering to receivers the powder discharged from said weigh bucket.

In a preferred weighing machine, the fluidiser and valve means are combined into a flow control device as described hereinabove. Similarly, the weigh bucket we prefer to use is one of the oscillatable buckets described hereinabove, the variant selected depending on the receiver used. Again, for delivering the charges to their receivers, we prefer to use delivery means of the kind described hereinabove as being suitable for use, inter alia, in net weighing machines.

In order to illustrate the invention, two particular weighing machines will now be described by way of example. The weighing machines are adapted for filling open mouthed sacks and valve sacks respectively, and illustrate how the various features described hereinabove may be combined into a single integrated weighing machine. In the description, reference will be made to the accompanying drawings in which:

FIG. 22 is a side elevation of the lower part of a twin spout machine for filling valve sacks, showing the mechanism for handling the sacks.

Figure 1:
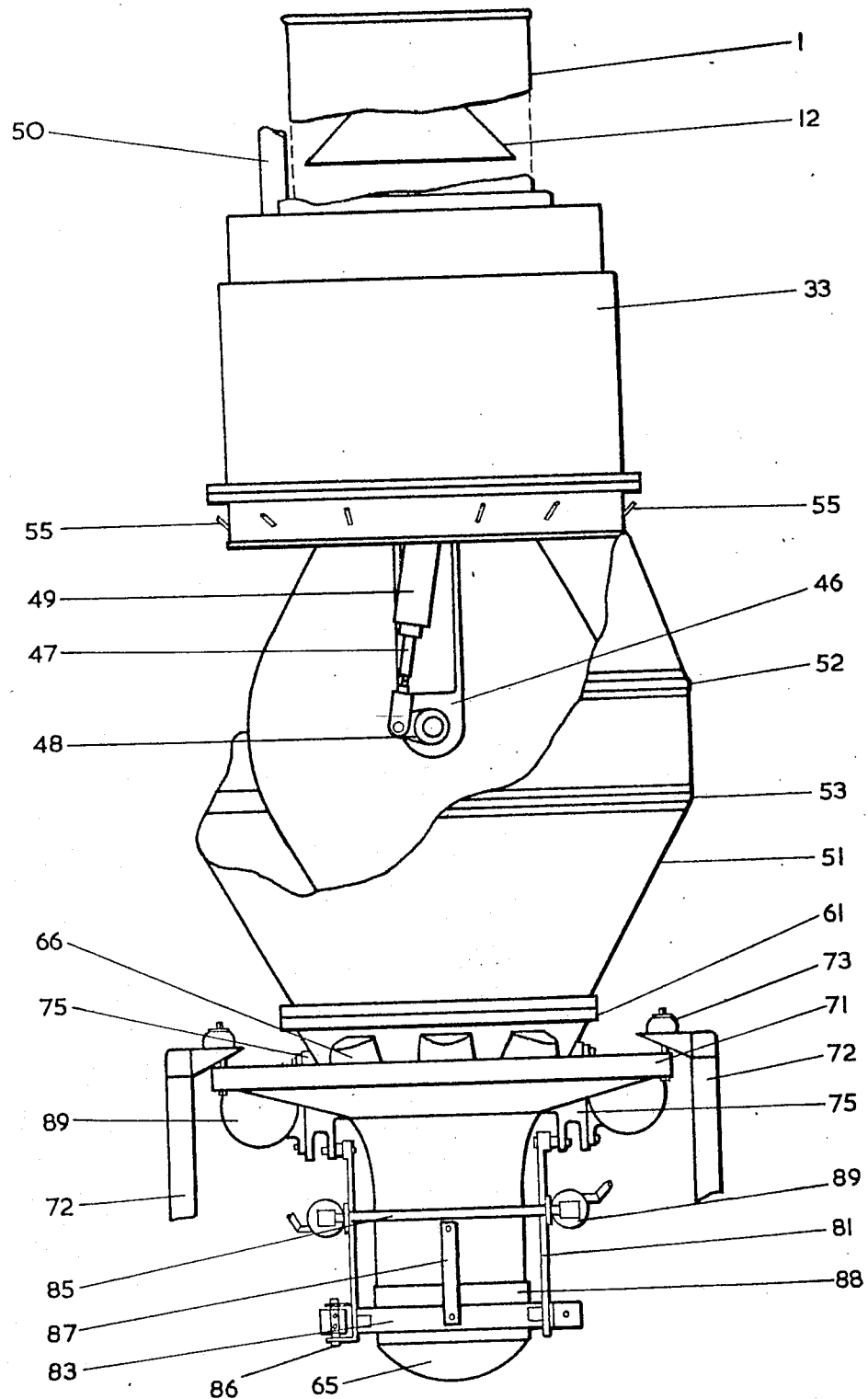
FIG. 1 is an elevation of the main features of the machine for filling open mouthed sacks, with parts of the flexible casing removed to show the weigh bucket, pneumatic oscillating means and other interior details.
Figure 2:
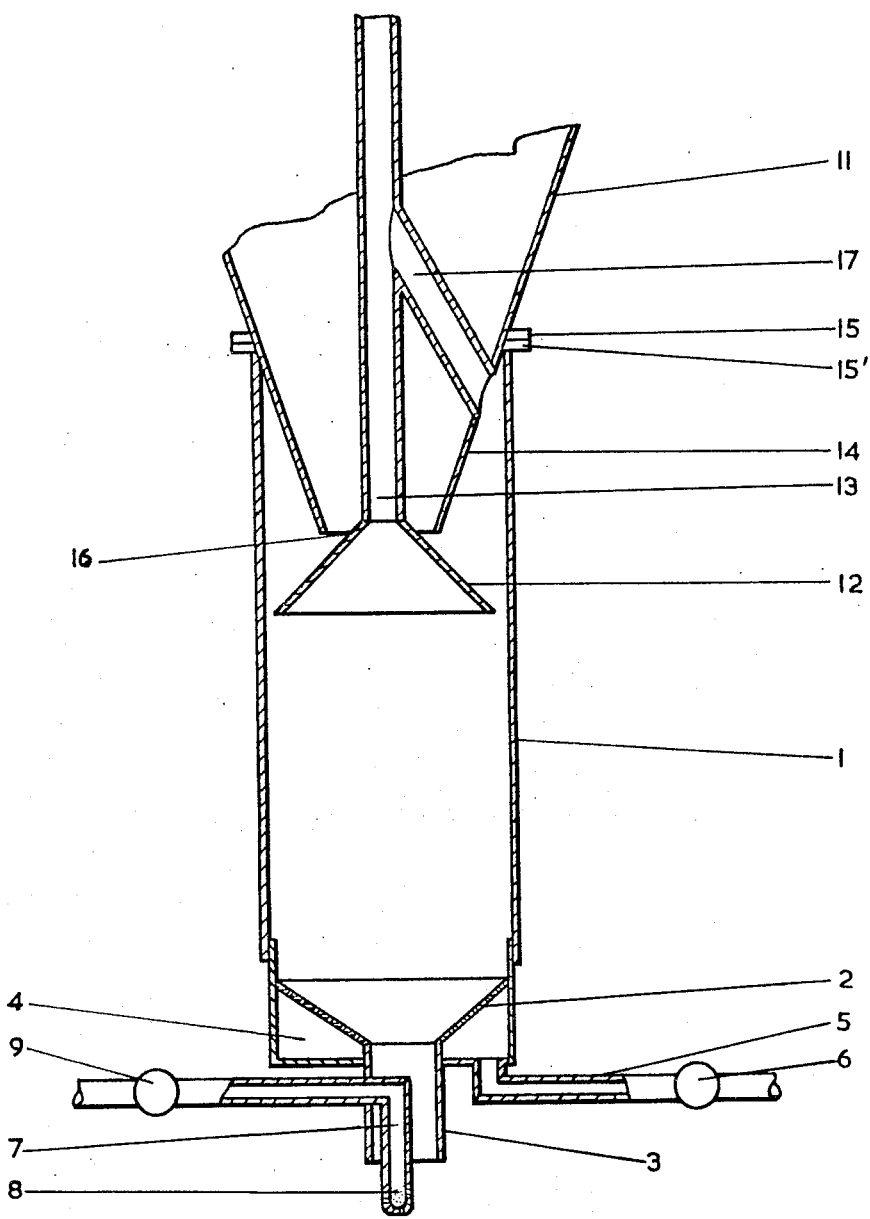
FIG. 2 is a cross-section through the fluidiser, provided at its upper end with a constant head device.

FIG. 1 illustrates a machine adapted for weighing charges of fine powder having a net weight of the order of 25 kg into paper sacks having open mouths, and may be divided into several functionally defined parts. These will be taken in turn for the purpose of describing the complete machine. The uppermost part is the fluidiser, which has a constant head device and is illustrated in FIG. 2. The fluidised powder flows through a valve mechanism which controls the rate of flow according to its three states as illustrated in FIGS. 3 to 8. On passing through the valve mechanism, the powder falls into a compartment of the weigh bucket illustrated in FIG. 9, surrounded by a flexible casing, illustrated in FIG. 10, connected at its lower end to a discharge funnel shown in FIGS. 11 to 13.

The fluidiser comprises a vertical cylinder having flexible walls 1 formed from a nylon fabric coated with polyurethane resin to make it impermeable. The walls 1 are shown foreshortened in FIG. 1. At the base of the cylinder is a porous cone 2 having a central outlet 3. The cone is formed from a perforated plate having 1 mm diameter holes at 10 mm pitch. Below the cone is an air chamber 4 into which compressed air may be blown via the inlet port 5. The rate of air flow is dependent on the material, but a rate of the order of $7 \times 10^3$ $cm^3 \, s^{-1}$ of free air, has been found convenient for most fine powders. The rate of air flow is controlled by reference to the reading of the pressure gauge 6. An air probe 7, terminating in a porous portion 8, extends downwardly through the outlet 3 to maintain the fluidisation in the conduit. The air probe 7 is offset because of the asymmetry of the partially closed valve described hereinafter. Air is supplied separately to the air probe via the gauge 9 at a pressure approximately one tenth of that used for the main air supply fed through the inlet 5.

The powder is stored in a mass flow storage hopper 11 of 25 tonnes capacity, but is only fluidised in small quantities as required. The powder which is fluidised is that retained within the flexible wall 1 whose height is adjusted so as to hold about two charges of powder. The flow of powder from the hopper to the fluidised cylinder is controlled by a constant head device comprising a cone 12 having a vent 13 extending upwardly from the apex of the cone 12, the apex angle being 90°. Suspended above the cone 12 is a steep sided funnel 14 connected to the storage hopper 11 by bolting together integral flanges 15. 15'. The cylinder walls 1 are suspended from the upper end of the funnel 14, and are spaced from the circumference of the cone 12 by about 2.5 cm, the cone itself being about 40 cm in diameter. The penetration of the cone into the funnel is variable, and may be adjusted to provide a gap 16 within the range of about 3.8 cm to 10 cm dependent on the rate of weighing required. A second air vent 17 joins the main air vent 13, and the combined vents pass upwards through the centre of the powder in the hopper 11, to open above the surface of the stored powder.

In operation, the fluidising cylinder 1 is filled with powder from the hopper, and air is blown through the inlet 5 into the chamber 4 and thence into the powder through the perforated plate 2. When sufficient air is blown into the material, the powder becomes fluidised in the normal manner, and the air is vented from the top of the column through the vent 13, the surface of the fluidised powder lying substantially at the level of the perimeter of the cone 12. As powder is drawn off through the outlet 3, the column is replenished by powder fed down the outer surface of the cone 12. Any air which escapes through the gap 16 is vented through the auxiliary vent 17. Any powder which is carried up the combined vents by the air, is deposited on the top of the powder in the hopper and may then be recycled. We have found the provision of flexible retaining walls 1 to be particularly convenient in that the state of fluidisation may be readily felt through the flexible material, and assembly and access for maintenance may be carried out more easily.

The flow of fluidised powder to the weigh bucket is controlled by the pinch valve illustrated in FIGS. 3 to 8. The valve is provided with two pairs of jaws mounted symmetrically about a resiliently flexible tube 21. The first pair of jaws comprises two horizontal bars 22 which are suspended on either side of the tube by L-shaped suspension members 23, the suspension members being pivotally connected at one end by journals 24 to the surrounding fixed framework indicated by the rectangle 25. The suspension members 23 are provided at their ends remote from the journals 24, with pins 26, by which they are connected to a pneumatic cylinder piston respectively. The pneumatic assembly would pass in front of the remainder of the mechanism in the view shown in the drawings, and has therefore been omitted in order to clarify the illustrations. Similar suspension members and pneumatic assembly are provided on the other side of the flexible tube. The horizontal bars 22 cover only part of the width of the tube, and are supported on cross-members (not shown) interconnecting the suspension members illustrated and the corresponding suspension members (not shown) on the other side of the tube.

The second pair of jaws has similarly a pair of horizontal bars 27, but which extend the full width of the tube 21. Levers 28 are pivotally mounted on the suspension members 23 by means of pins 29, and the bars 27 are mounted on cross-members interconnecting the levers 28 at the front and back of the tube 21 respectively. The upper ends of the levers 28 are interconnected by a second set of pneumatic cylinders and pistons 30. The lower ends of the levers 28 are biased towards the flexible tube by means of springs 31 attached to the fixed framework represented by the squares 32. The valve mechanism is located within the housing designated 33 in FIG. 1.

Figure 3:
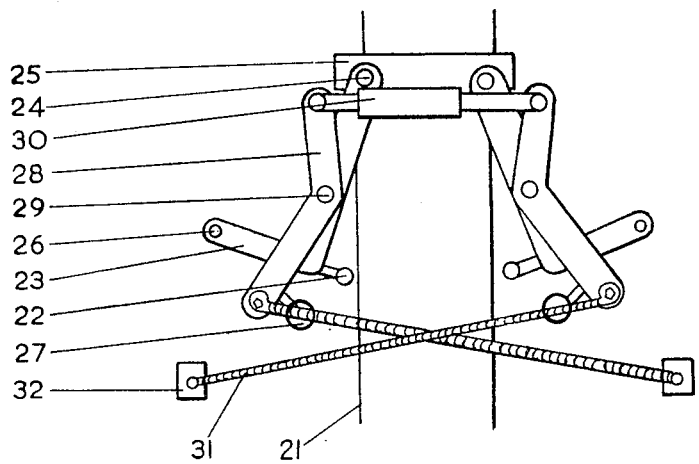
FIGS. 3, 4 and 5 are corresponding elevations of the pinch valve showing the mechanism set for full flow, trickle flow and shut-off states of the valve respectively.
Figure 6:
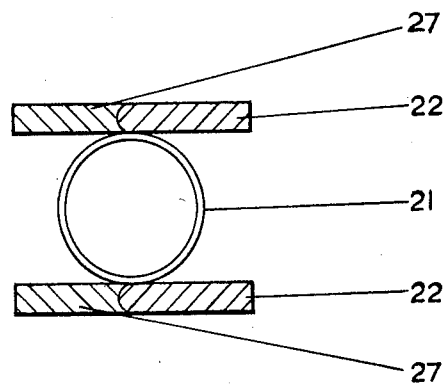
FIGS. 6, 7 and 8 are sections through the resiliently flexible tube and jaws in the positions corresponding to those of FIGS. 3, 4 and 5 respectively.

In FIG. 3, the bars 22, 27 of both sets of jaws are held clear of the flexible tube 21, so that the flow of material through the flexible tube is not restricted. The jaws are held in the position shown in FIG. 1 against the bias of the springs 31, by the main pneumatic piston (not shown) connected by the pins 26 to the two suspension members 23. In this state, the flexible tube has a substantially circular cross-section as shown in FIG. 6.

Figure 4:
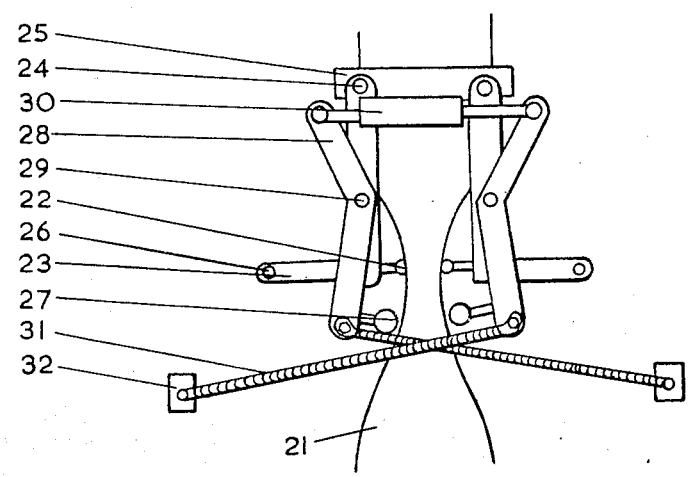
Figure 7:
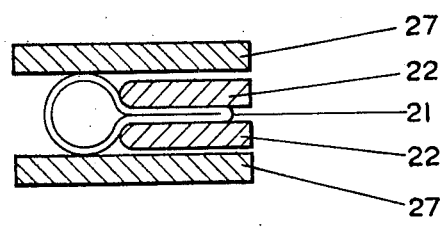

To obtain a reduced flow rate, the pressure in the main pneumatic cylinder is reversed so that the horizontal bars 22 are pushed towards each other so as to press on either side of the flexible tube with sufficient force to bring the two sides into sealing engagement, but only over about 60% of the diameter of the tube. This restricts the flow passage as illustrated in FIG. 7, and the valve mechanism in this position is illustrated in FIG. 4. The upper ends of the suspension levers 28, are retained in the same spaced-apart relationship for the reduced-flow position of FIG. 4 as in the full-flow position of FIG. 3, by the auxiliary pneumatic cylinder 30. The auxiliary bars 27, are however brought into the proximity of the flexible tube, as shown in FIG. 4, as the levers 28 supporting the bars 27 are carried on the suspension members 23 which are swung towards each other. This reduces the time required for the eventual closure of the second pair of jaws.

Figure 5:
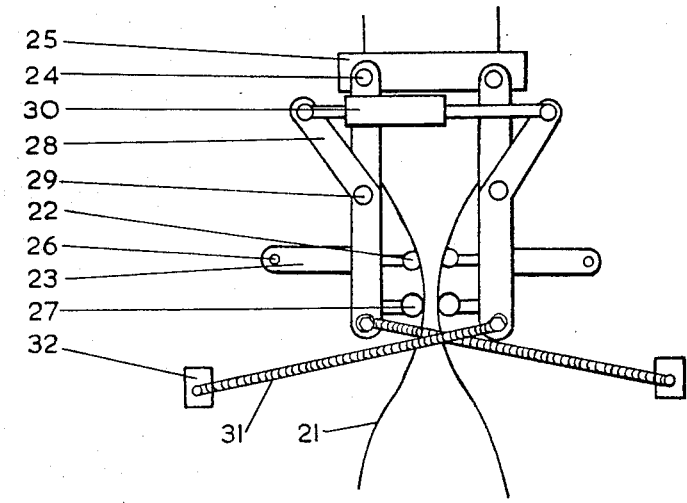
Figure 8:
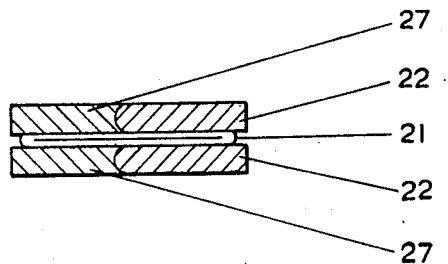

The fully closed state illustrated in FIG. 5, is obtained by reversing the pressure in the auxiliary pneumatic cylinder 30, and forcing the upper ends of the levers to move outwards so as to bring the second set of bars 27 together and squeeze the tube over its full diameter to provide the fully closed state, as shown in FIG. 8.

The springs 31, while assisting in the closure of the jaws, provide a "fail-safe" action. Thus if there should be a power failure and loss of air pressure in the pneumatic cylinders, the valve will close under the biasing forces of the springs 31. Such a "fail-safe" action is most desirable, since a pair of jaws retained in the outer position due to failure of the pneumatic system, would allow the particulate material to continue flowing until the hopper was emptied.

Figure 9:
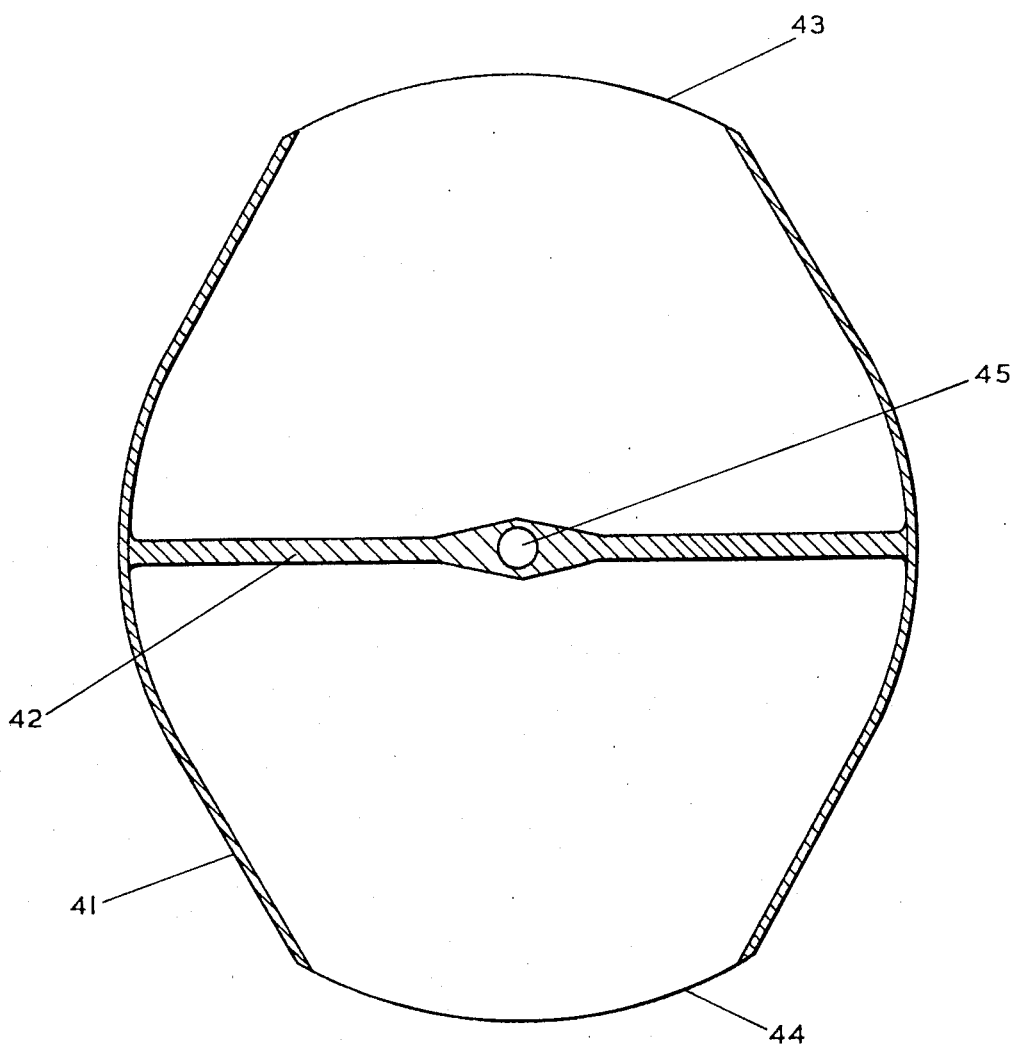
FIG. 9 is a cross-section of the weigh bucket.

The weigh bucket, illustrated in FIG. 9, is in the form of a hollow shell 41 moulded from a glass fibre reinforced polyester resin, and is sub-divided into two equal compartments by a transverse web 42. The sides of each compartment are tapered towards the open ends 43, 44. The weigh bucket is rotatably mounted within the machine by means of trunnions 45 located mid-way along the transverse web 42, the trunnions being mounted by journal bearings in two struts 46. (FIG. 1). The two struts extend downwards from two opposite sides of a generally horizontal rectangular frame (not shown) which is mounted on a conventional weigh beam by knife edges engaging the other two sides of the frame. In this manner the axis of rotation of the weigh bucket is arranged to be perpendicular to the axis of the knife edges.

The trunnions 45 are each connected at one end to a drive shaft 47 through a crank 48 (FIG. 1), and power for the rotary oscillation is supplied from the cylinder 49 operated by compressed air. Movement of the weigh beam is detected by proximity switches so as to avoid physical contact between the beam and any switching mechanism, and the beam is arrested during the initial loading of the bucket so as to prevent initial over-run. The weigh beam is housed in the same housing 33 as the pinch valve.

At the start of a weighing cycle for delivering a charge of 25 kg of powder the weigh bucket is arranged with an open end 43 beneath the exit of the flexible tube leading from the flow control valve. With both pairs of jaws of the control valve open, powder is allowed to run freely from the fluidising cylinder through the valve and into the empty uppermost compartment of the weigh bucket. This is continued until approximately 23 kg of powder has been delivered to the bucket, the first pair of jaws of the control valve then closing to allow the powder to flow at a reduced rate until the required net weight of 25 kg has been delivered, at which point the control valve closes completely. At the completion of the weighing cycle when the required net weight has been delivered to the bucket, the bucket is rotated through 180° so that the other open end 44 is presented to the supply tube. At the end of the second cycle, the bucket is rotated in the opposite direction to that of the first cycle, the direction of rotation being alternated between successive cycles.

Around the mouth of the uppermost weigh bucket compartment, air knives (not shown) to which suction is applied, are provided to remove any powder which leaves the supply tube and fails to fall into the weigh bucket, and returns any such powder to the supply hopper via a pipe 50, in order to prevent any such unweighed material from reaching the receivers. Suction is, however, cut off from the air knives during the trickle feed as the desired charge weight is approached, in order to prevent the occurrence of any lift induced thereby on the weigh bucket.

Figure 10:
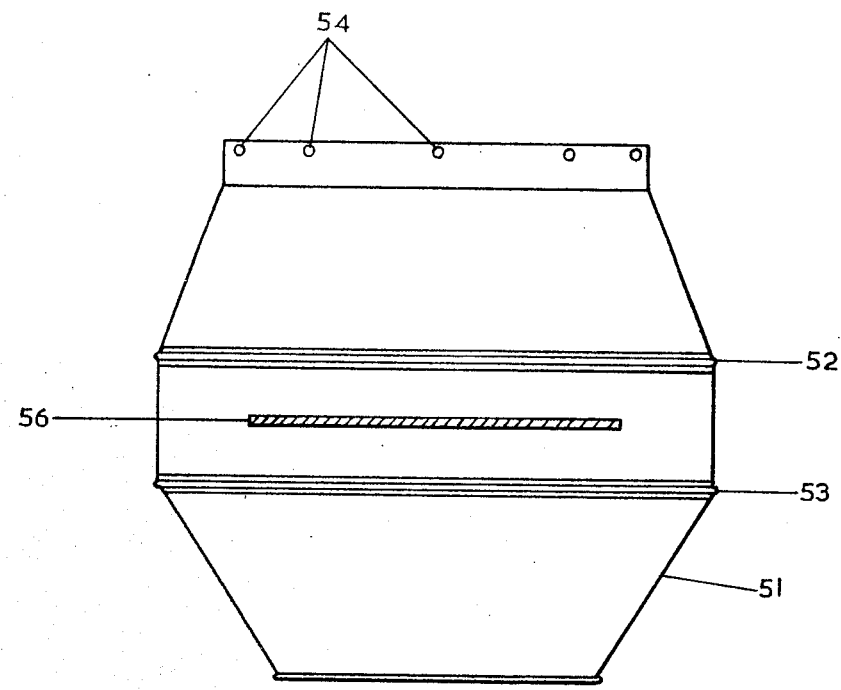
FIG. 10 is an elevation of a flexible casing for surrounding the weigh bucket.

The weigh bucket is surrounded by a flexible casing 51, illustrated in FIG. 10. The casing 51 is again formed from a woven nylon fabric, coated with polyurethane resin which renders the surface of the fabric more slippery and generally prevents the build up of powder thereon. The casing is shaped to encompass the weigh bucket while providing sufficient clearance to enable the weigh bucket to be rotated. To obtain this clearance, the fabric is held in shape by two spring-steel wire beads 52, 53 sewn around the circumference of the fabric. The casing is provided at its upper end with a series of eyelets 54, by which it may be hung from pegs 55 located around the control valve housing 33, and clamped against a rubber sealing collar by a flexible steel band. In order to improve access to the weigh bucket, bearings and oscillating means, zip fasteners 56 are provided on each side of the casing.

Figure 12:
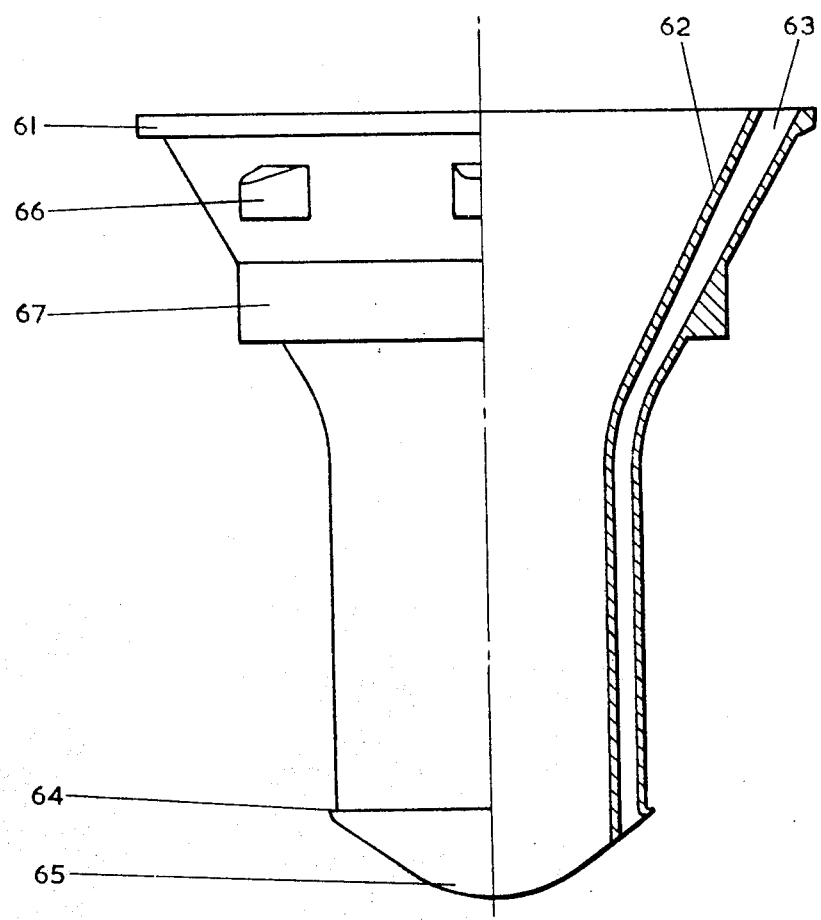
FIG. 12 is a view of the funnel along the line AA of FIG. 11 shown in a part elevation and part section.
Figure 11:
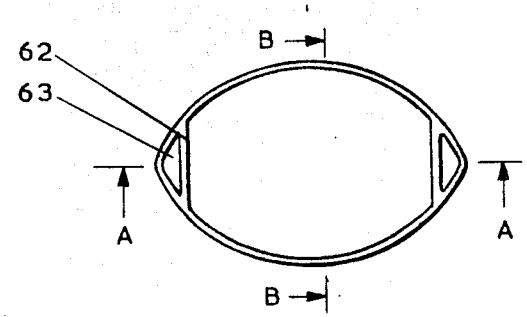
FIG. 11 is a transverse section through the lower end of a delivery funnel.
Figure 13:
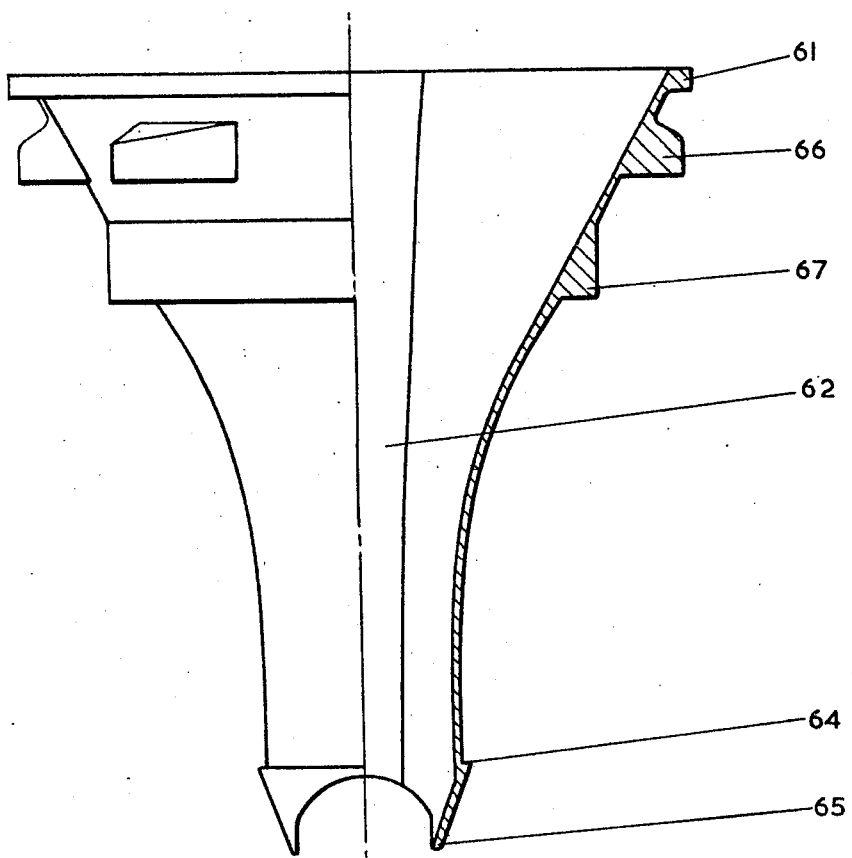
FIG. 13 is a view of the funnel along the line BB of FIG. 11 shown in part elevation and part section.
Figure 14:
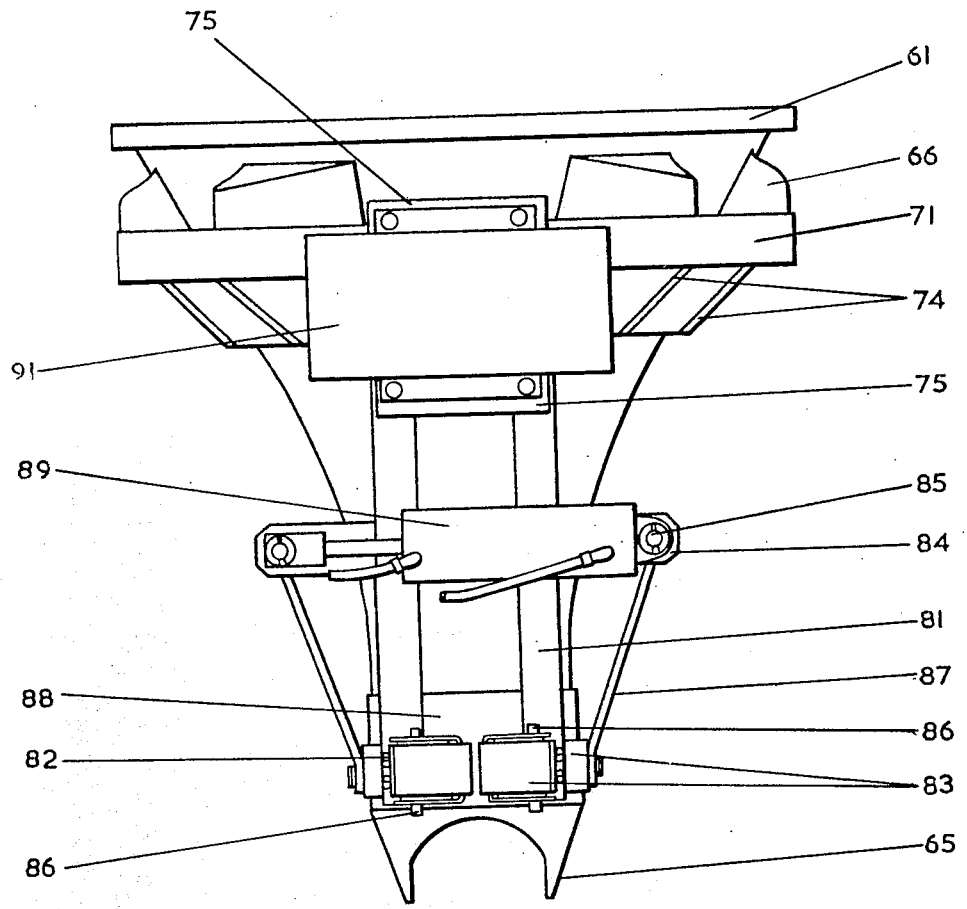
FIG. 14 is an elevation of the lower part of the machine, showing means for clamping a sack to the end of a funnel, the view being perpendicular to that of FIG. 1.

The charge is emptied from the weigh bucket into a vertical delivery funnel formed from glass fibre-reinforced polyester, and illustrated in FIGS. 11, 12 and 13. The upper end of the funnel is flared outwards to form a substantially circular mouth, having an outward facing flange 61 around the perimeter. As the funnel tapers, the outer surface becomes lenticular in shape towards the exit of the funnel, in order to assist in the clamping of the receiving sacks thereto. The inner wall is provided with two webs 62 which continue the full height of the funnel from the exit up to the mouth, in order to provide an escape duct 63 for air from the receiver. The internal surface of the mouth of the funnel is at 30° to the longitudinal axis, and this angle is reduced until the sides are substantially parallel to the longitudinal axis near the exit end of the funnel. The change in slope of the inner surface of the walls is gradual and smooth in the plane BB of FIG. 11, but because of the required lenticular shape near the exit, the change in taper in the plane AA of FIG. 11 is somewhat more abrupt. The lower end of the funnel is provided with a small flange 64, and the two sides having the larger radius of curvature are downwardly extended to form two lips 65 for assisting in the insertion of the end of the funnel into the receiving sack. The outer surface of the upper end of the funnel is provided with a number of lugs 66 and an annular shoulder 67 for mounting purposes.

In use, the funnel provides means for guiding the charge smoothly into the receiving sacks while venting the air separately up the ducts 63. Since the ducts open out into the flexible casing at the upper end, any powder entrained in the escaping air is delivered to the mouth of the funnel and hence is returned to the receiving sack.

The lower part of the machine is supported on a harness 71 suspended from a fixed frame 72 by a resilient suspending means 73. The supporting harness has two downward facing ribs 74 on each side of the funnel, and perpendicular to said ribs are two mounting brackets 75 situated on either side of the funnel and extending both above and below the harness 71. The funnel is supported on the harness by the shoulder 67; the lugs 66 housing mounting screws provide a more positive location.

The clamping means is illustrated in both FIGS. 1 and 9, and consists of two co-operating jaws pivotally mounted on the brackets 75 and arranged symmetrically about the funnel. Each jaw has two supporting members 81 pivotally mounted on the brackets 75 at their upper ends and their lower ends each being provided with a transverse bracket 82 to which is attached a webbing strap 83 interconnecting the two transverse brackets 82. The supporting members 81 have side arms 84 extending away from the funnel, the side arms of each jaw being interconnected by a rod 85. At one end, the strap 83 is connected to the transverse bracket by a cam rotatable about a vertical pin 86, rotation of the cam serving to alter the length of the strap. The strap 83 is sufficiently long to follow the outer surface of the funnel assembly, and hence is longer than the direct distance between the two transverse brackets 82. Support for the clamping strap 83 is therefore provided mid-way between the brackets 82 and comprises a supporting strap 87 suspended from the rod 85. To assist in the provision of a powder-tight joint the lower end of the funnel opposite the clamping strap 83 is provided with a rubber sleeve 88, retained in place by the small flange 64. Power for the clamping means is supplied by pneumatic cylinders 89, interconnecting the outer ends of the arms 84 of the two different jaws.

To operate the clamping means, the pneumatic cylinders are initially expanded so as to lift the clamping straps 83 clear of the end of the funnel. The mouth of the receiving sack is than placed around the rubber sleeve 88 so that any gussets or folds in the sack extend sideways in a direction parallel to the transverse brackets 82. The pneumatic cylinders 89 are then contracted, until the strap 83 is pressed hard against the outer surface of the bag, which is thereby retained between the strap 83 and the sleeve 88. The sack is then in position to receive the charge, the clamp having sufficient grip to support the sack while the charge is being delivered. When delivery of the charge is complete, the two jaws are opened by the pneumatic cylinder, enabling the filled sack to be removed and replaced by a second sack.

The vibrating means comprises two out-of-balance electric motors 91 which are rotated at a rate of 1440 r.p.m. during the process of weighing. The motors 91 are securely mounted on the brackets 75 of the supporting harness. When the two motors are rotated in opposite directions at the same time, they tend to become synchronised and cause the entire assembly to be vibrated in a vertical plane. The assembly is free to vibrate on account of the resilient suspension members 73, and an amplitude of about 0.65 cm at a frequency corresponding to the rate of rotation of the motors, i.e. 1440 r.p.m., is generally convenient.

When weighing fine powders into paper sacks as charges having a net weight of 25 kg, we achieved throughputs of 15 tonnes/hour with most types of powder. Although this is a figure which was generally readily obtainable within a tolerance of ± 0.25%, it is not intended that this figure should be taken as a promise that this is attainable with all types of powder.

In the machine described above, the particulate material was supplied to the constant level device from a mass flow hopper, i.e. a hopper whose sides are sufficiently steep to provide mass flow. By employing such a hopper, the material is supplied smoothly at a pressure independent of the quantity of material in the hopper. Mass flow hoppers are therefore preferred to hoppers having sides at a more shallow angle where flushing and arching of the material are most likely to provide a very uneven flow to the constant level device.

In addition to the benfits of smooth outflow from a mass flow hopper, because the outlet pressure is independent of the height of material therein, the hopper may be selected from a large range of sizes to suit the particular requirements. Thus for example, the 25 tonne hopper described was selected for handling material from a process producing 20 tonne batches, but hopper sizes may range, for example, from 1 to 1000 tonnes or more capacity as required.

Figure 15:
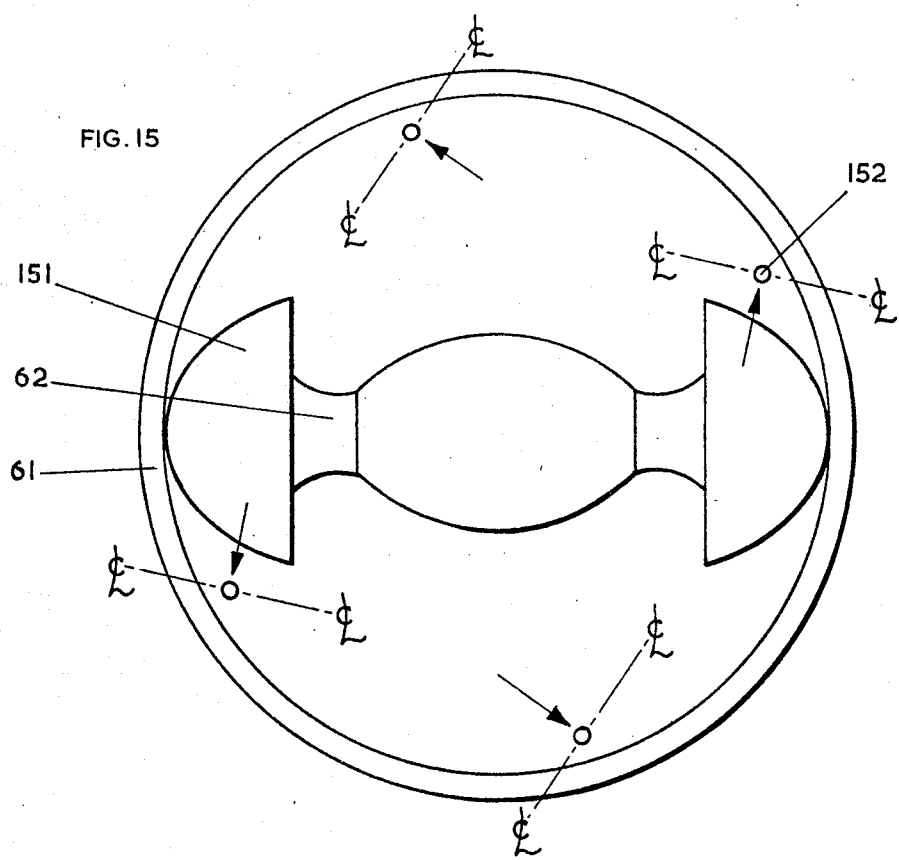
FIG. 15 is a plan of a funnel modified by the provision of deflector plates and air-blast nozzles.

Two modifications to the above machine which we have found to be of benefit are the provision of deflectors for controlling the vented air, and the provision of air jets around the mouth of the delivery funnel as illustrated in FIG. 15. The drawing is a plan view of a funnel essentially the same as that shown in FIGS. 11 to 13, having an outward facing flange 61 around its mouth and webs 62 sealing off the duct for venting the escaping gas. We found fine powder entrained in the air escaping up the vent 63 tended to be blown into the casing causing delay in its return to the sack. We now find that by placing a sloping plate 151 across the top of the duct so that the air is forced out sideways from beneath the plate, the powder is returned directly to the funnel and thence to the sack from which it was blown. There is also less tendency for powder to enter the top of the duct 63.

Figure 16:
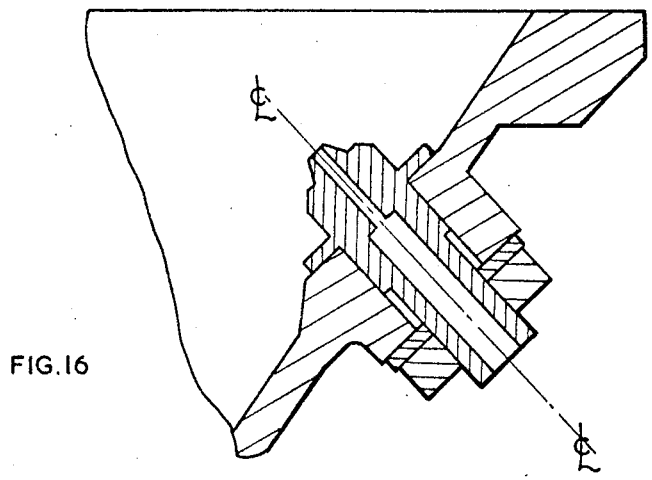
FIG. 16 is a sectional detail of FIG. 15 showing the installation of a single nozzle.

The second modification was the provision of inwardly and upwardly directed air nozzles. Four nozzles were used, being one for each inner wall of the weigh bucket compartment. FIG. 16 is an enlarged section of part of the funnel taken through one of the nozzles and viewed in the direction of the relevant arrow in FIG. 15. The centre line is shown in both drawings and the angle this makes is shown with reference to the horizontal rim around the top of the flange 61 in FIG. 16. Immediately after the weighed powder has been discharged from the weigh bucket, a blast of moist air at high pressure is emitted from the nozzles. Because of the elevation of the nozzles and their angle to the radius of the funnel, the air is blasted into the weigh bucket with a swirling motion which we have found to be particularly effective in dislodging powder left behind by the bulk of the charge.

While being a popular form of packaging for fine powders, valve sacks present more acute problems in the rapid delivery of charges of fine powders through such a restricted opening, while venting the trapped air with no substantial loss of weighed powder. We will therefore now describe a weighing machine adapted for filling valve sacks. Since the problems only arise in the delivery of the powder after it has been weighed, the hopper, fluidiser, flow control valves, weigh beam, flexible casing and posser may be identical to those described above. As stated earlier, the principal alteration lies in the use of twin funnels, but the effect of this is felt first in the weigh bucket, which must be adapted to discharge its load to one side and then the other alternately.

Figure 17:
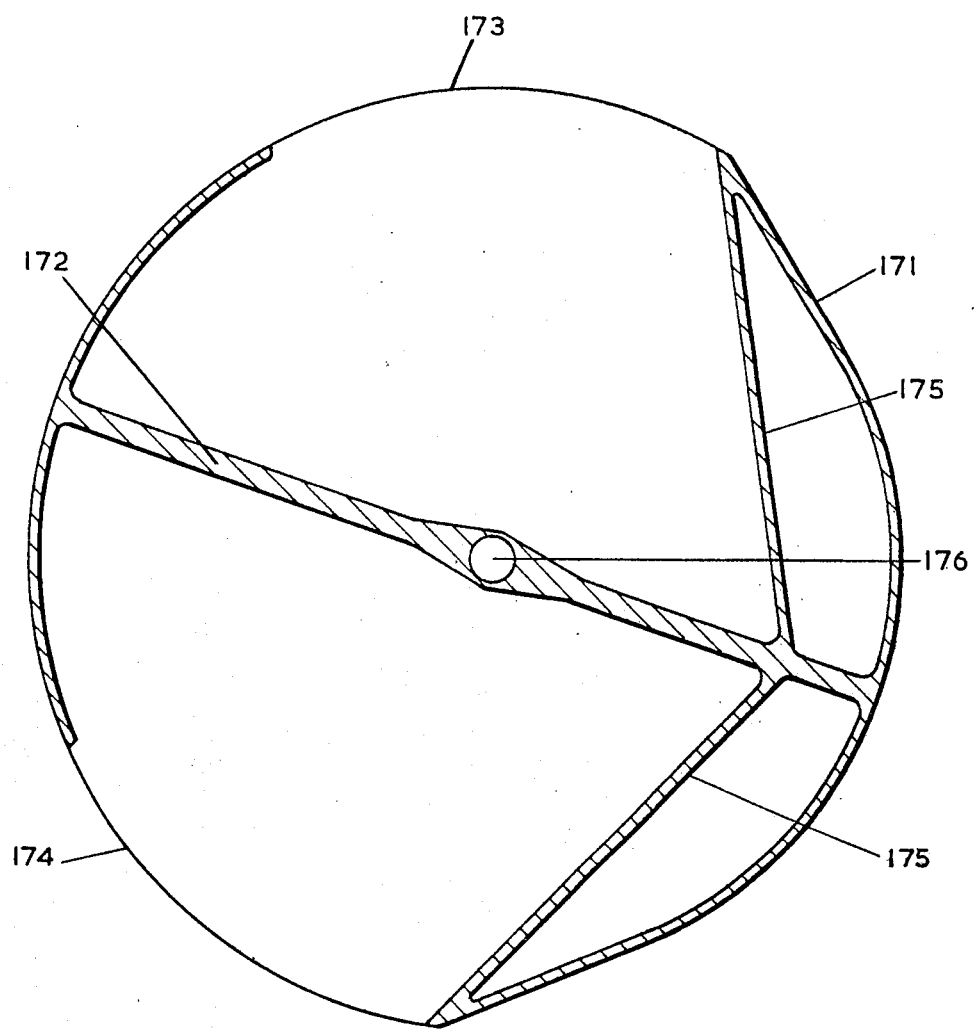
FIG. 17 is a cross-section of a weigh bucket adapted for delivering its charges to alternate funnels for filling valve sacks.

The weigh bucket used is illustrated in FIG. 17, and comprises a hollow shell 171 moulded from a glass fibre reinforced polyester resin. The shell is sub-divided by a transverse web 172 to form two compartments, one the mirror image of the other. Each compartment has an outward-facing opening 173, 174 and a floor 175. Extending on either side of the weigh bucket are trunnions 176 located mid-way along the transverse web 172. The trunnions are mounted in journal bearings in two struts extending downwardly from a weigh beam in the same manner as that used in the other machine described hereinabove. Power for the rotary oscillation is again supplied by a pneumatic cylinder, but the stroke is adjusted so as to limit the rotation of the bucket to 150° instead of 180° as previously. The floor 175 of the bucket has been provided in order to increase the angle of attack of the part of the bucket supporting the powder, this being advisable for ensuring ready discharge on account of the reduced degree of rotation.

Figure 18:
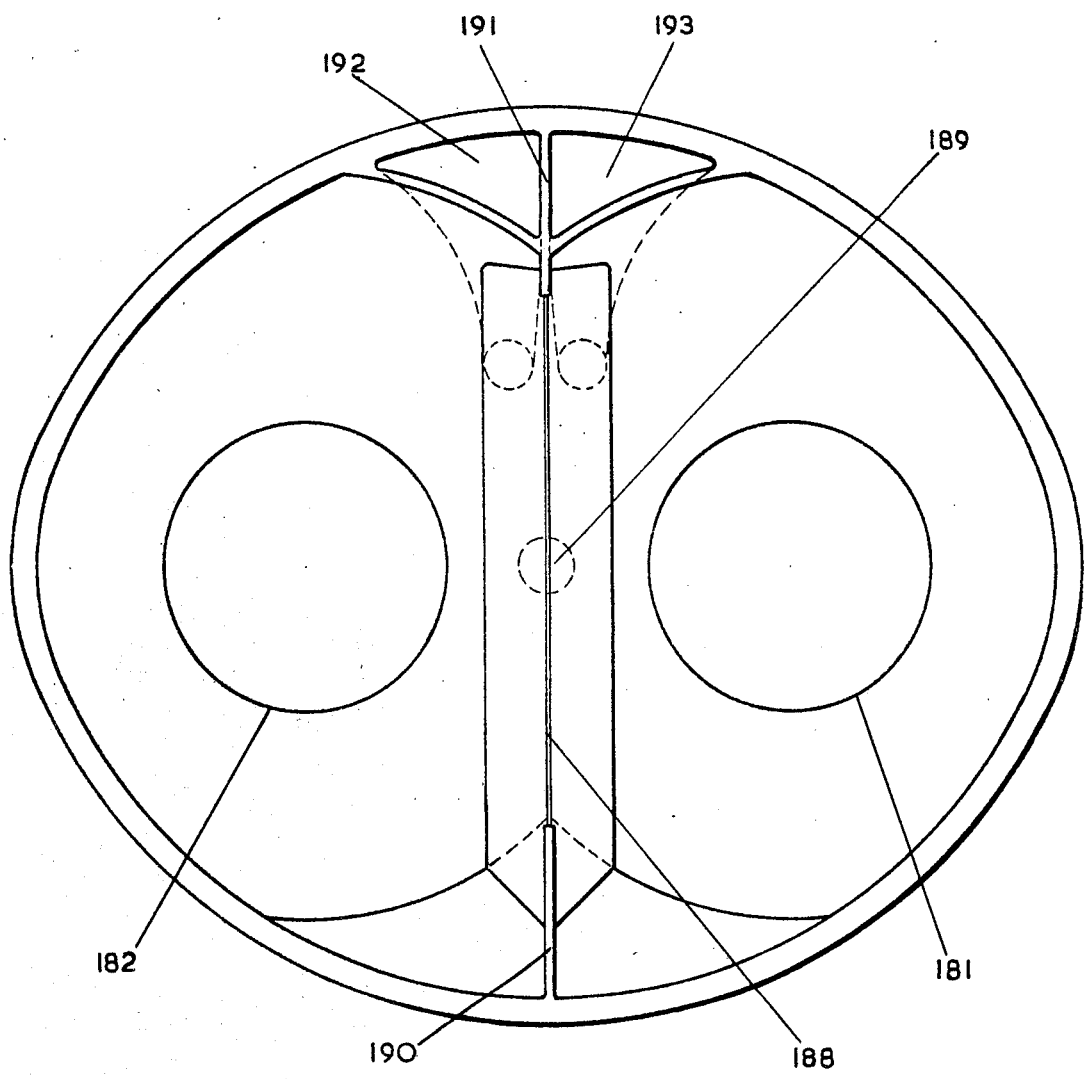
FIG. 18 is a plan of the fused mouths of a pair of funnels for filling valve sacks.
Figure 19:
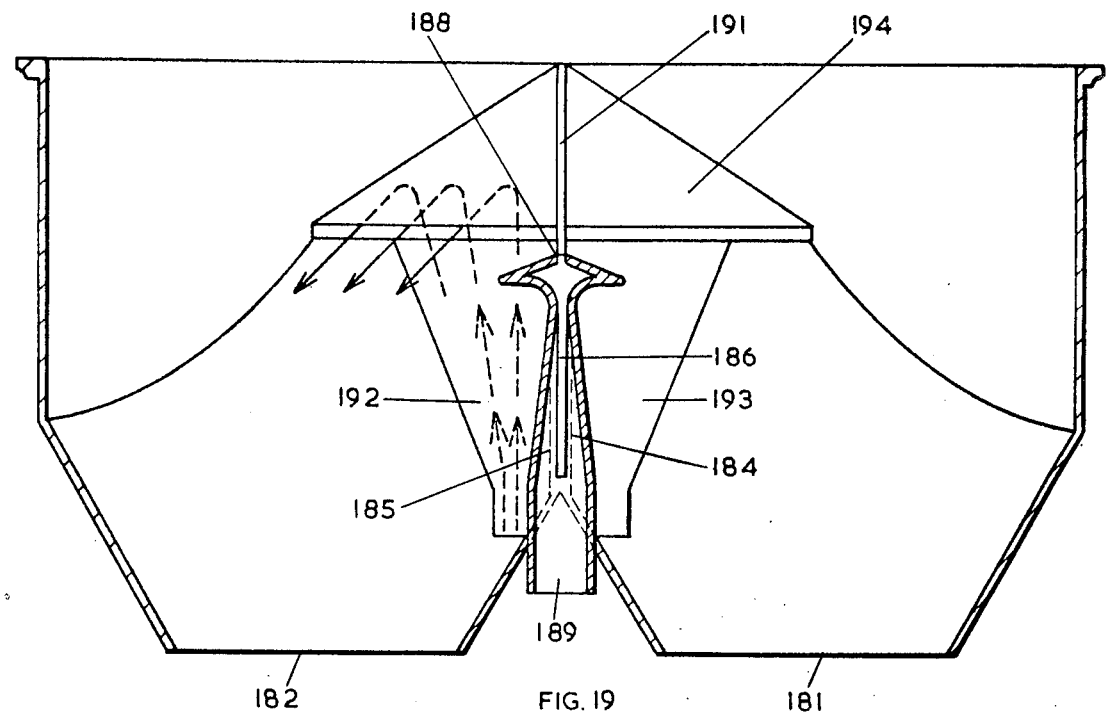
FIG. 19 is a vertical section through the funnel mouths of FIG. 18.
Figure 20:
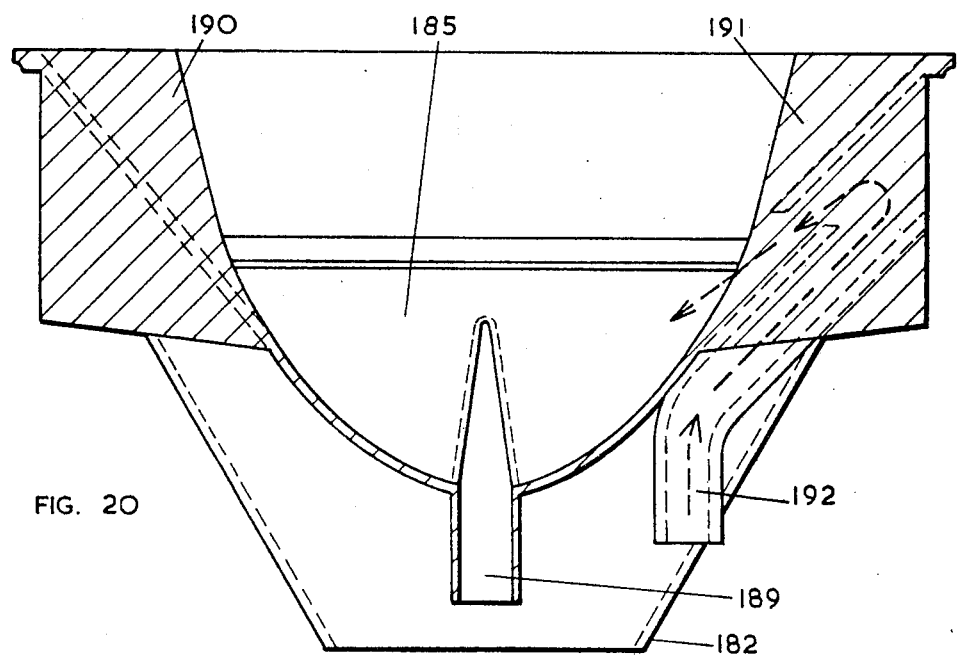
FIG. 20 is a vertical section through the funnel mouths in a plane perpendicular to that of FIG. 19.

The modified funnel has been divided into upper and lower portions for convenience. The upper portion is illustrated in FIGS. 18 to 20, and provides a split hopper having a common mouth at its upper end, becoming divided to form two legs 181, 182 at its lower end. In the plan view of FIG. 18, the operator would normally be positioned facing the edge shown at the bottom of the drawing. Dividing the hopper into its two parts is a transverse weir 183 having two spaced-apart sides 184, 185 parallel over most of their area so as to provide a narrow chamber 186 therebetween. At their upper end, the sides are flared outwards and thence returned until they almost meet leaving a slot 188 therebetween, extending across most of the width of the funnel. In the centre of the funnel is an air passage 189 which is faired into the weir and which communicates with the chamber 186 therein.

At either end of the slot is a barrier 190, 191 extending upwards to the level of the mouth. At the rear of the hopper are two pipes 192, 193 which emerge on either side of one of the plates 191, the two pipes forming the upper end of two ducts for venting the air from the sack. Above each of the upper outlets of the two pipes 192, 193, is a deflector plate 194 (not shown in FIG. 18) arranged to deflect the air rushing up the ducts so that any powder carried by it may be deflected towards the centre of its respective funnel. The path of the venting air in one of the pipes is shown by arrows in FIGS. 19 and 20.

Figure 21:
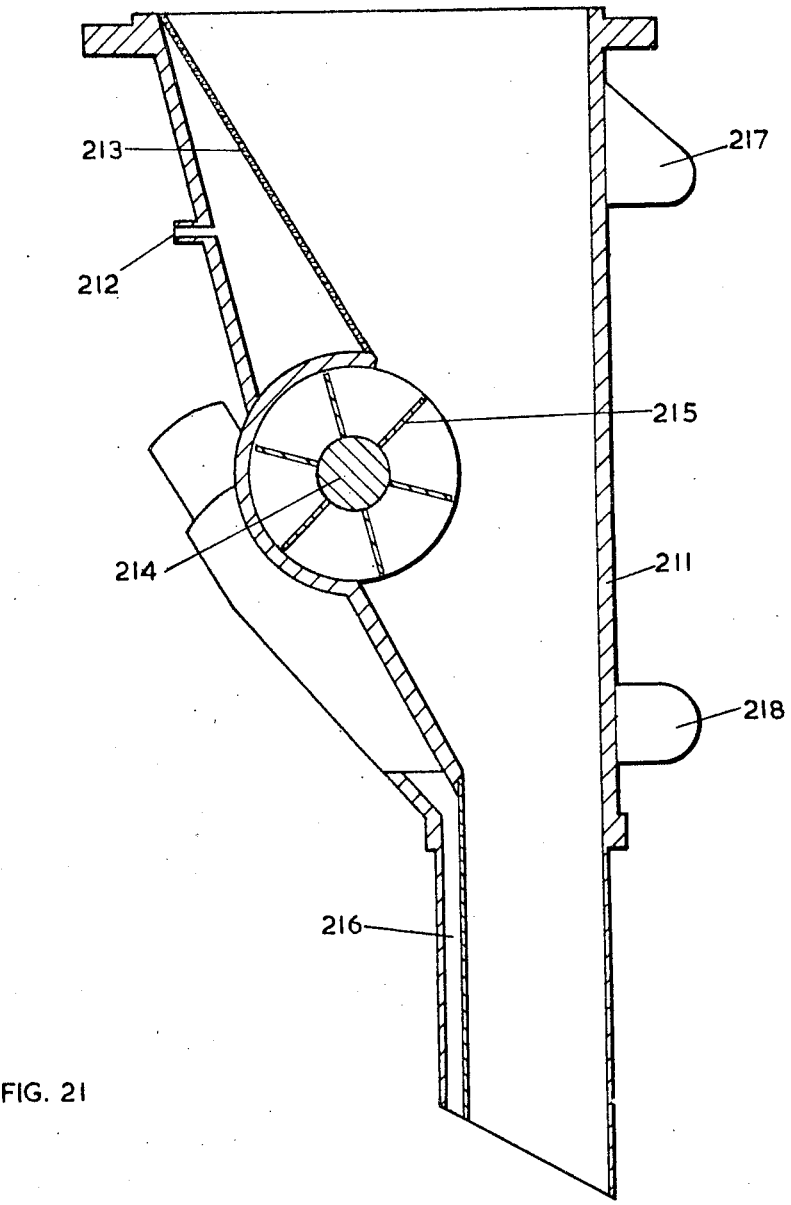
FIG. 21 is a vertical section through the spout of one of the funnels of FIGS. 18 to 20, incorporating both fluidiser and impeller.

Below the hopper are two spouts forming the lower portions of the funnels, one spout being clamped to each leg. One of the spouts, that clamped to the left leg 182, is illustrated in FIG. 21, in a view perpendicular to that of the operator. The spout has an outer casing 211, having a circular cross-section at its upper end, this being tapered to provide a cylindrical outer surface at its lower end. At the upper end is an air chamber having an inlet 212 for air under pressure, and a porous plate 213 providing a fluidising pad through which air may be blown for fluidising the descending powder.

At the lower end of the air chamber, the spout has become constricted into a throat by the angle of the fluidising pad 213. Immediately below the air chamber is an impeller having a spindle 214 extending across the full width of the spout, blades 215 extending radially from the spindle about half way across the diameter of the throat. The blades are divided into three adjacent sets, each set having three blades, with the middle set being out of phase with respect to the outer sets such that their appearance when viewed along the axis of rotation, is one of six equi-distant blades. The impeller is rotated clockwise in the view illustrated, at about 3000 r.p.m.

Running up the spout within its cylindrical confines, is a duct 216, which subsequently continues up one side of the spout so as to avoid the impeller. The duct 216 is connected to the pipe 192 by external means (not shown) incorporated in a cradle used for securing the two spouts to the legs of the split hopper.

On the front of both spouts are two pairs of spaced apart lugs 217, 218 to which are attached pneumatically powered clamping means for holding the valve in place on the end of the spout. The clamping means is again pneumatically operated, but with the valve sacks we find it is sufficient to have the valve clamped by a single pad 222 on the front of the machine, the sack being supported on a vibrated supporting cradle 223 while being filled.

The supporting crade 223 is carried in trunnions 224 at its lowest edge between arms 225 having a counterbalance 226 at the other end. The arms are pivotally mounted in bearings 227, being rotated by powerful air cylinders 228 through a small angle from the discharge position (shown chain dotted) to the upper supporting position (shown in full lines). The supporting cradle 223 has an out-of-balance vibrator motor 229 which posses the sack being filled with an oscillating motion about the trunnion 224. We find in practice with this machine that possing is essential for short cycle times, to clear the dense stream of powder from the filling spout and to consolidate it rapidly in the sack to allow the optimum sack sizes to be used.

As soon as all the powder has been discharged from the spout, the clamping pad 222 is removed to free the valve. The counterbalance arm 225 is then swung downwards clearing the sack from the spout. In the discharge position shown chain dotted, air cylinders 231 rotate the sack cradle 223 about the trunnions 224 ejecting the sack over a rubber-covered roll-over bar 232 causing it to roll over onto its valve end, thereby closing the valve against powder in the sack. This roll-over operation is particularly effective in providing efficient closure of the valve, and preventing subsequent loss of powder through the valve during handling operations. The sack is arranged to fall onto a suitable conveyor system, which may be either parallel to or perpendicular to the spouts, as desired.

This sack handling means is preferred because besides an efficient and rapid operation, it provides a low headroom installation enabling the operation of the machine to be carried out from a seated position in front of the two spouts, equi-distant from each. Empty sacks are stacked on tables on either side of the operator, who changes one sack while the other is being filled. In this manner, we have filled valve sacks repeatedly with charges of 25 kg, with cycle times sufficiently short to enable a filling rate of one bag every 4½ to 6 sec to be achieved, depending on the powder being packed.

We claim:

1. A weighing machine for repeatedly delivering to receivers a predetermined charge of fine powder comprising:
    a fluidizer having an outlet, in which the powder is fluidized and maintained with an approximately constant head of fluidized powder above the outlet at least at the start of each weighing cycle,
    a rotatable weigh bucket mounted on weight-sensing means, said weight-sensing means generating a signal in response to weight in said weigh bucket, said weigh bucket having separate compartments arranged so that by rotation of said weigh bucket each compartment may in turn be positioned for receiving powder from said fluidizer while another compartment discharges its load,
    valve means connected to said fluidizer outlet for controlling the flow of powder from said fluidizer, said valve means being operable in response to a signal generated by said weight-sensing means, and
    means for delivering to receivers the powder discharged from said bucket.

2. A weighing machine according to claim 1 in which said valve means comprises a resiliently flexible tube connected to said fluidizer outlet and at least one pair of jaws closeable about said tube so as to collapse a portion of said tube and bring the sides thereof into sealing engagement.

3. A weighing machine according to claim 2 in which said valve means include first and second pairs of jaws closeable about said resiliently flexible tube so as to press together the sides of said tube into sealing engagement, said first pair of jaws being closeable about only a fraction of the diameter of said tube so as to leave the remainder of the tube open and provide a restricted flow passage therethrough and provide said valve means with a partially closed state, and said second pair of jaws being closeable about the full diameter of said tube to provide said valve means with a fully closed state.

4. A weighing machine according to claim 1 in which said rotatable weigh bucket has two separate compartments of corresponding size and shape with spaced apart outwardly facing openings arranged so that when one opening faces upwardly for receiving powder to be weighed, said other opening faces downwardly so that powder therein is discharged by gravity.

5. A weighing machine according to claim 4 further comprising means connected to said weigh bucket for oscillating said weigh bucket between said two positions in which each of said two compartments in turn faces upwardly to receive its load while said other compartment discharges its load, said compartments being so shaped that each of said compartments discharges its load along a path different from the discharge path of the other compartment, and said means for delivering the discharged powder comprises two funnels, each positioned in one of said paths to intercept powder discharged along each respective path, whereby powder weighed in one compartment is discharged into one funnel, and material weighed in the other compartment is discharged into the other funnel.

6. A weighing machine according to claim 1 in which said means for delivering the weighed powder to the receiver comprises a casing enclosing said weigh bucket except for an upper opening to permit said weigh bucket to be charged therethrough, and a lower opening to permit said weigh bucket to discharge its load therethrough, at least one funnel having at its upper end a mouth connected around said lower opening of said casing by a substantially powder-tight joint, clamping means for securing the receiver to the lower end of said funnel to produce a substantially powder-tight joint therebetween, and at least one duct for venting the air displaced from the receiver by the charge, the upper end of said duct being returned to said delivery means so that any powder carried by the venting air may be returned to the receiver.

7. A weighing machine according to claim 6 in which said casing is flexible.

8. A weighing machine according to claim 6 further comprising a plurality of nozzles around said mouth of said funnel, said nozzles disposed at an angle such that a high pressure jet of air emitted from said nozzles would be directed against the inside surface of a weigh bucket compartment positioned for discharge of its load.

9. A weighing machine according to claim 6 wherein an impeller having rotatable blades is associated with said funnel to drive the powder down said funnel.

10. A weighing machine as recited in claim 1 wherein each compartment of said weigh bucket has a fixed volume.

* * * * *